C. A. MORALES.
AUTOMATIC TEAPOT.
APPLICATION FILED SEPT. 27, 1916.
1,211,614.
Patented Jan. 9, 1917.
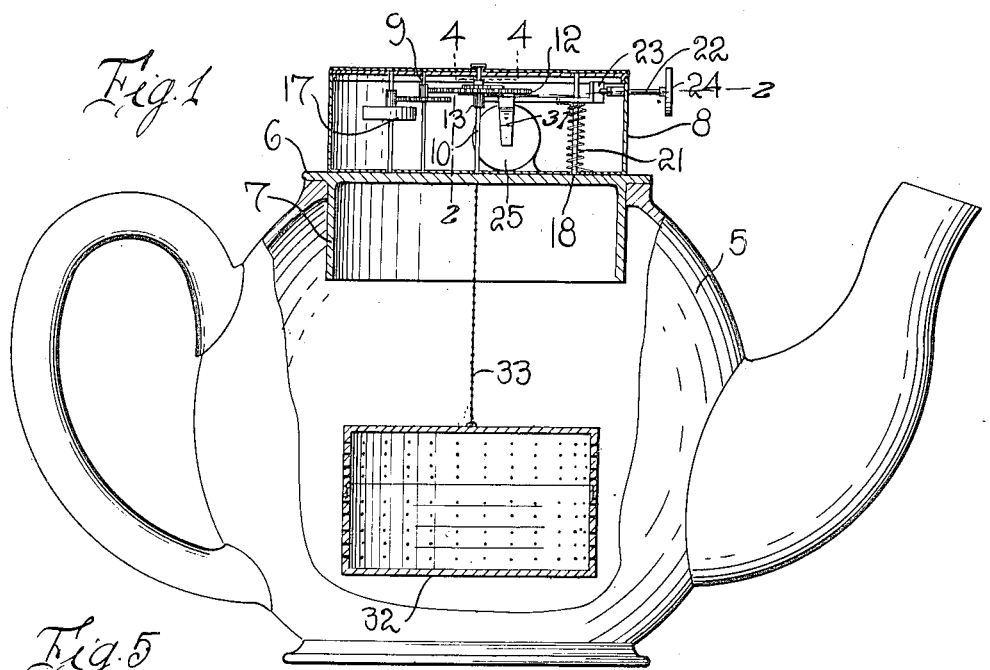
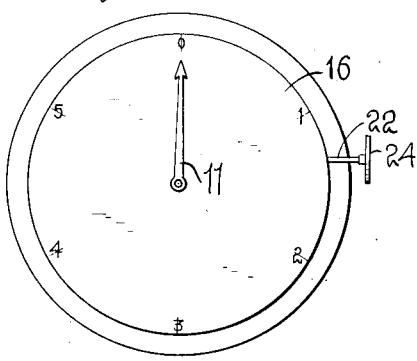
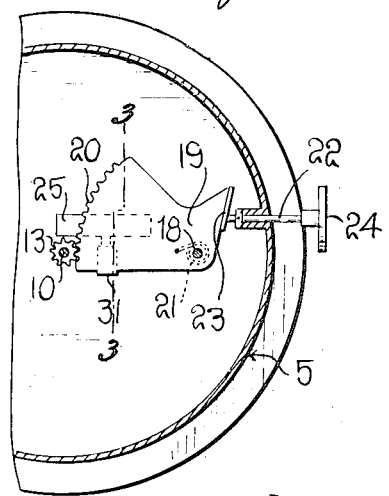
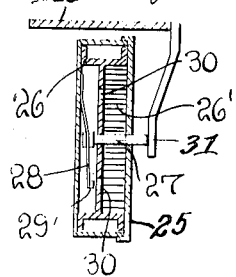
Inventor
CALEB A. MORALES
By Watson E. Coleman
Attorney

UNITED STATES PATENT OFFICE.

CALEB A. MORALES, OF NEW YORK, N. Y.

AUTOMATIC TEAPOT.

1,211,614. Specification of Letters Patent. Patented Jan. 9, 1917.

Application filed September 27, 1916. Serial No. 122,456.

*To all whom it may concern:*

Be it known that I, CALEB A. MORALES, a subject of the King of England, residing at New York city, in the county of New York and State of New York, have invented certain new and useful Improvements in Automatic Teapots, of which the following is a specification, reference being had to the accompanying drawings.
This invention relates to an improved automatic teapot and has for its primary object to provide a very simply constructed time-controlled device for brewing tea whereby the possibility of the tea remaining in the water for too long a time, which will result in a bitter and distasteful decoction, is obviated.

It is another and more particular object of the invention to provide a device of the above character embodying a tea ball or container suspended within the pot, and time-controlled mechanism including a spring-actuated drum to which the suspending element is connected, whereby the container may be elevated at a predetermined time above the level of the water.

The invention has for a further general object to provide a device for the above purpose which is particularly desirable in demonstrating the making of tea, and when the materials are prepared, the mechanism may be properly set and the removal of the tea leaves from the liquid at the proper time positively assured.
With the above and other objects in view, my invention consists in the novel features of construction, combination and arrangement of parts to be hereinafter more fully described, claimed and illustrated in the accompanying drawing, in which, Figure 1 is a sectional view through a teapot showing my improved automatic tea making device applied thereto; Fig. 2 is a section taken on the line 2—2 of Fig. 1;
Fig. 3 is a vertical section through the winding drum taken on the line 3—3 of Fig. 2; Fig. 4 is a detail horizontal section taken on the line 4—4 of Fig. 1; and Fig. 5 is a plan view of the dial.
Referring in detail to the drawing, 5 designates the teapot or receptacle which may be constructed of earthenware or other suitable material and of any desired ornamental form. The top wall of the body of the pot is provided with the usual opening to receive a lid or closure 6 having a depending annular flange 7 extending downwardly into the pot.

Upon the removable lid 6, a metal casing 8, preferably of cylindrical form, is secured.
This casing houses the gear train 9 of an ordinary clock mechanism, and upon the main shaft or spindle 10 which projects above the top wall of the casing 8, a hand or pointer 11 is fixed. The master gear 12 of the mechanism is loosely mounted upon this shaft, and immediately beneath said gear a pinion 13 is fixed on the shaft. A ratchet wheel 14 is also secured upon the shaft 10 above the gear 12 and is engaged by a spring-pressed pawl 15 mounted upon the upper face of said gear. The hand 11 moves over the face of a dial plate 16 secured upon the top wall of the casing 8. This plate is suitably graduated at its outer edge to indicate a lapse of six minutes, and the actuating spring for the gear train, indicated at 17, is so constructed and of such tension and the gears are of the proper ratios as to move the hand 11 in the proper manner.

Upon a fixed, vertical rod 18 secured in the top walls of the case 8, a gear segment 19 is loosely mounted, said gear segment being horizontally disposed and the teeth 20 thereof meshing with the pinion 13 on the shaft 10. A coil spring 21 is disposed around the rod 18 and has one of its ends fixed in the gear segment 19 and the other end suitably secured to the bottom wall of the case 8. A horizontally shiftable rod 22 is mounted in one side of the case 8 and bears at its inner end against an upstanding flange 23 on the gear segment 19. The outer end of this rod is provided with a suitable finger piece 24.

A drum case 25 is mounted within the main casing 8 and has a drum 26 rotatably arranged therein upon a pin 27 which projects through one of the side walls of the drum case. The drum is actuated by a spirally coiled spring 26' fixed at one of its ends to the drum and at its other end to the case wall. This pin is axially movable with respect to the drum 26 and has its inner end connected to a leaf spring 28, upon the free end of which a lug 29 is formed for engagement in any one of the series of openings 30 formed in the central web of the drum 26. The gear segment 19 is provided with a depending arm 31 at one end of the series of teeth 20 thereon, and the lower end of this arm is opposed to the pin 27.

32 designates a tea ball or container which is preferably constructed of two foraminous, porcelain sections threaded or otherwise detachably connected together. One end of a chain or other flexible suspending element 33 is attached to this container and extends upwardly through an opening in the drum case 25 and is suitably secured at its other end to the drum 26.

In the use of the device, the cover or lid for the pot is removed and the container 32 filled with the necessary quantity of tea leaves. Boiling water is then poured into the pot 5 and the chain 33 pulled from the drum 26, thereby winding the spring 26'. The hand 11 is set by pushing the rod 22 inwardly, thereby rotating the gear segment 19, the spindle 10 and the hand 11, the gear 12 remaining stationary. The cover is then applied with the container 32 suspended in the boiling water and pressure on the rod 22 released. The clock mechanism then immediately operates to reverse the rotation of the hand 11, moving the same from its set position in a counter-clockwise direction back to zero or the starting point. In the setting of the hand or indicator, it will be understood that the spring 21 is coiled and placed under tension, and acts independently of the clock spring 17 to reverse the rotation of the gear segment 19. In this reverse movement of the indicator, the gear 12 is, of course, locked to the shaft 10 by means of the ratchet and pawl 14 and 15. When the hand 11 again arrives at zero, the arm 31 on the gear segment 19 will be forced against the pin 27 by the spring 21 and move the same inwardly to disengage the lug 29 from the drum 26, thereby releasing the drum so that the spring 26' will unwind and wind up the chain 33, thereby elevating the container 32 above the level of the liquid in the pot 5. In this manner, it will be readily seen that the hand or indicator 11 may be readily disposed in position indicating the number of minutes the tea leaves should remain in the boiling water, in accordance with the particular brand or mixture of teas used.

I have found the device particularly desirable and advantageous when used by demonstrators for the making of tea to be tasted or sampled by prospective purchasers, as it precludes possibility of tea leaves being allowed to remain for too long a time in the boiling water, which not infrequently occurs owing to carelessness or forgetfulness on the part of the demonstrator. The device is, however, also very serviceable and convenient for ordinary domestic use.

From the above description, taken in connection with the accompanying drawing, the construction, manner of use and several advantages of my invention will be clearly and fully understood.

The time-controlled mechanism which I have herein described is quite simple, reliable in its action, and may be manufactured at relatively small cost. It is, nevertheless, to be understood that I do not desire to be limited to this precise actuating mechanism for the suspended tea container, it being manifest that various other analogous mechanisms might be employed to accomplish the same result.

It is to be noted that all of the parts of the device are carried by the removable top or cover for the teapot so that the interior thereof will not be obstructed and can be easily and thoroughly cleaned. Neither do I desire to be restricted to the precise mounting of the casing or housing for the time mechanism since it is obvious that the same may be arranged within the cover or closure instead of mounted upon the upper surface thereof. The device is also susceptible of many minor modifications in the form, construction and arrangement of the several elements employed and I, therefore, reserve the privilege of adopting all such legitimate changes as may be fairly embodied within the spirit and scope of the invention as claimed. For instance, the casing or housing 8 may be formed of wood, earthenware, or porcelain, or some other non-conductor of heat, or the metal casing may be suitably insulated in order to obviate possible injury to the mechanism contained therein.

Having thus fully described my invention, what I desire to claim and secure by Letters Patent is:

1. The combination with a vessel and closure therefor, a spring controlled drum mounted upon the closure, latch means holding the drum against rotation under the action of its spring, a container, a flexible element connected at one of its ends to the container and at its other end to said drum, a movable element having means to engage and actuate the latch device of the drum, manually operable means to dispose said element in a predetermined position with respect to the latch device, and timing mechanism with which said element co-acts and whereby it is moved to actuate the latch and release the drum, whereby the container is elevated in the vessel.

2. The combination with a teapot and closure therefor, of a casing carried by said closure, a spring-controlled drum mounted in said casing, latch means holding the drum against rotation under the action of its spring, a flexible element connected at one of its ends to the drum, a tea container to which the other end of said element is connected and by which it is suspended within the pot, a dial secured to the casing, an indicator movable over the dial, clock mechanism to actuate said indicator, a gear segment geared to the clock mechanism, a spring connected to said gear segment, manually operable setting means to actuate the gear segment and set the indicator, said spring urging the gear segment to its normal position, and means on the gear segment co-acting with the latch means for the drum to release the drum upon the return of the gear segment to normal position, whereby the tea container is elevated above the level of the liquid in the pot.

In testimony whereof I hereunto affix my signature in the presence of two witnesses.

CALEB A. MORALES.

Witnesses:
A. E. KEELY,
E. PAUL SMITH.